United States Patent [19]
Seitz

[11] Patent Number: 5,805,823
[45] Date of Patent: Sep. 8, 1998

[54] SYSTEM AND METHOD FOR OPTIMAL MULTIPLEXED MESSAGE AGGREGATION BETWEEN CLIENT APPLICATIONS IN CLIENT-SERVER NETWORKS

[75] Inventor: Greg Seitz, San Jose, Calif.

[73] Assignee: Wayfarer Communications, Inc., Mountain View, Calif.

[21] Appl. No.: 593,901

[22] Filed: Jan. 30, 1996

[51] Int. Cl.⁶ .................................................. G06F 13/42
[52] U.S. Cl. ................................ 395/200.66; 395/200.59; 395/200.64
[58] Field of Search ..................... 395/200.66, 200.33, 395/200.74, 200.68, 200.67, 200.59, 200.64, 200.37, 200.62, 684, 683; 370/432, 359

[56] References Cited

U.S. PATENT DOCUMENTS

| | | | |
|---|---|---|---|
| 4,771,391 | 9/1988 | Blasbalg | 364/514 |
| 4,777,595 | 10/1988 | Strecker et al. | 395/200.66 |
| 4,954,965 | 9/1990 | Johnson et al. | 395/200.66 |
| 5,036,518 | 7/1991 | Tseung . | |
| 5,293,488 | 3/1994 | Riley et al. | 395/200.74 |
| 5,392,398 | 2/1995 | Meyer | 395/200.33 |
| 5,440,687 | 8/1995 | Coleman et al. . | |
| 5,553,242 | 9/1996 | Russell et al. | 395/200.12 |
| 5,577,211 | 11/1996 | Annapareddy et al. | 395/200.13 |
| 5,598,535 | 1/1997 | Breech et al. | 395/200.66 |
| 5,613,155 | 3/1997 | Baldiga et al. | 395/825 |
| 5,649,103 | 7/1997 | Datta et al. | 395/200.03 |
| 5,682,478 | 10/1997 | Watson et al. | 395/200.12 |

OTHER PUBLICATIONS

Casner, S., Schulzrinne, H., and Kristol, D.M. "Frequently Asked Questions (FAQ)on the Multicast Backbone (MBONE)", Apr. 28, 1994.

*Primary Examiner*—Frank J. Asta
*Assistant Examiner*—Matthew Kaminer
*Attorney, Agent, or Firm*—Fenwick & West LLP

[57] ABSTRACT

A system and method provide a messaging architecture for real time, asynchronous data exchange and request handling by multiple client applications in a network. Each client application effectively, simultaneously, send messages to and receive messages from, any number of other client applications on the network while maintaining only a single network connection to a server. The message architecture provides for multiplexed aggregation of messages being sent to client applications, thereby maximizing network efficiency, and reducing bandwidth requirements. The messaging architecture is fully asynchronous so that client applications need not pend on the receipt or handling of their messages by other client applications.

11 Claims, 8 Drawing Sheets

SYSTEM AND METHOD FOR OPTIMAL MULTIPLEXED MESSAGE AGGREGATION BETWEEN CLIENT APPLICATIONS IN CLIENT-SERVER NETWORKS

RELATED APPLICATION

This application is related to the application Ser. No. 08/593,968, filed on Jan. 30, 1996, entitled SELF-DESCRIBING OBJECT PROVIDING DYNAMIC MANIPULATION OF HETEROGENEOUS DATA VALUES AND SEMANTIC IDENTITY BETWEEN MEMORY AND TRANSMISSION, which is incorporated by reference herein. Both applications are assigned to Wayfarer Communications, Inc. of Mountain View, Calif.

BACKGROUND

1. Field of Invention

The present invention relates to systems and methods for transmission of data between distributed clients on a network, and more particularly, to systems and methods that control the distribution and aggregation of messages between clients.

2. Background of Invention

Client-server computing has become the predominant model of distributed computing, paralleling the increasing performance of desktop computers and workstations. In a client-server distributed computing environment, multiple computers are connected in a network, and a computer may operate both as client, a consumer of resources and data, and a server, a producer of resources and data for the clients.

In one type of network arrangement, a client communicates with other clients through a central server. A first client sends requests for communication with a second client to the server, which establishes a connection between the two clients. The server then relays data between the clients. Typically, each connection between clients requires a separate network connection, that must be maintained so long as the clients are in communication with each other. Thus, each time a first client is to connect with a second client, a separate connection must be created, maintained, and then torn down when the connection is completed. This limits the number of connections each client may handle simultaneously to other clients. In addition, considerable efficiency is lost if two clients need to communicate repeatedly over a given time interval. Either, a single connection is made and maintained, thereby limiting the overall number of simultaneous connections that each client may hold, or each connection must be made and torn down as needed, thereby consuming client and server resources for the management of connection turnover.

In addition, because each client-server-client connection is dedicated, there is typically an under-utilization of bandwidth in the connections. This is because when a first client sends a message to the second client, it may not completely use the maximum capacity of the network packet being transmitted. Thus, an entire network packet is transmitted between the clients, even though it contains only a relatively small number of messages with respect to its maximum capacity. The inefficiency of this process becomes particularly apparent when there is a large number of first clients attempting to communicate with a given second client. For example, assume that the second client is a stock data application that provides real time stock quotations in response to requests from clients. Suppose that there are 100 clients, each attempting to obtain stock quotations. A single request by a client need typically transfer a message indicating the particular stock of interest, and that a quotation request is being made. Suppose further that a network packet is actually able to hold 60 such messages. In a conventional model, each message takes one network packet. Thus, 100 packets are sent, whereas, only 3 packets would need be sent if each network packet contained the maximum number of messages. In addition, in networks such as the Internet, where an acknowledgment of each packet is used in the TCP protocol, the large latency of the network response, and the round trip time required for acknowledgments makes the client-server-client system network bound in its ability to deliver messages between the clients.

It is desirable therefore, to provide a messaging system and method that allows clients to communicate with each other through a central server without having the inefficiencies of dedicated connections between clients. In particular, it is desirable to provide a system and method that makes optimized use of the capacity of network packets for sending messages from multiple clients to a single client, and allows a given client to communicate with a number of clients beyond that supported by a model requiring a single physical connection between each pair of clients.

SUMMARY OF THE INVENTION

In accordance with one aspect of the present invention, there is provided a system for client-server-client communication that optimally assembles messages being transmitted between clients. In one embodiment of the present invention, each client maintains one or more connections with a server. Each connection is a single physical connection held by a connection object. Each connection object of a first client maintains a list of second clients with whom the first client is communicating over the single physical connection; this allows each physical connection to host any number of virtual connections.

A first connection object in first client is connected to an inbound connection object in the server, without the connection objects of the clients being directly connected. Each server connection object likewise maintains a list of the second clients that the first client connection object is in virtual communication with. The server thereby supports multiple connection objects, one for each connection object in each client. Each server connection object acts as both an inbound (from the client connection object it is immediately connected to) and an outbound (to another server connection object) mechanism.

A message from a first client connection object in a first client identifies the second client to whom the message is being sent. A first server connection object receives this message from the first connection object. The server determines from the message which of its connection objects with other clients holds the connection to a connection object of the identified second client. The server then passes the message from its first connection object to this second, server connection object. This second server connection object receives each message and places it in a message queue to be sent to the identified second client. The queue is sized to correspond to a maximum transfer unit for a network packet on the connection to the second client. This second connection object will continue to receive messages from any of its sister connection objects in the server, and hence from any other connection object in any client. When the queue is full, or there are no more messages to be sent, the messages in the queue are sent in a network packet. In this manner, the network packet will always be optimally utilized for those messages that are available for sending. In other words, messages from any number of clients to a single client become optimally aggregated before being sent to the single client.

Similarly, when a single client has numerous messages to send to multiple clients, it can aggregate all of these message into as few network packets as are needed and send them to the server. The server disaggregates the messages from the packets, sending each message to the client to whom the message is destined. Again, network bandwidth is fully utilized while simultaneously optimally reducing the number of network connections necessary for communication between the clients. In accordance with another aspect of the invention then, there is provided a method for sending messages between two client applications through a central server, each client coupled to the server over a single connection.

Finally, in another aspect of the invention, there is provided application development tools for creating client applications and a server application for optimal aggregation of messages. The application development tools include class definitions for connection objects, a server engine, and client engines. These development tools may be used to create any variety of client-server applications using the messaging architecture of the present invention.

DETAILED DESCRIPTION OF THE INVENTION

Overview of the System

Figure 1:
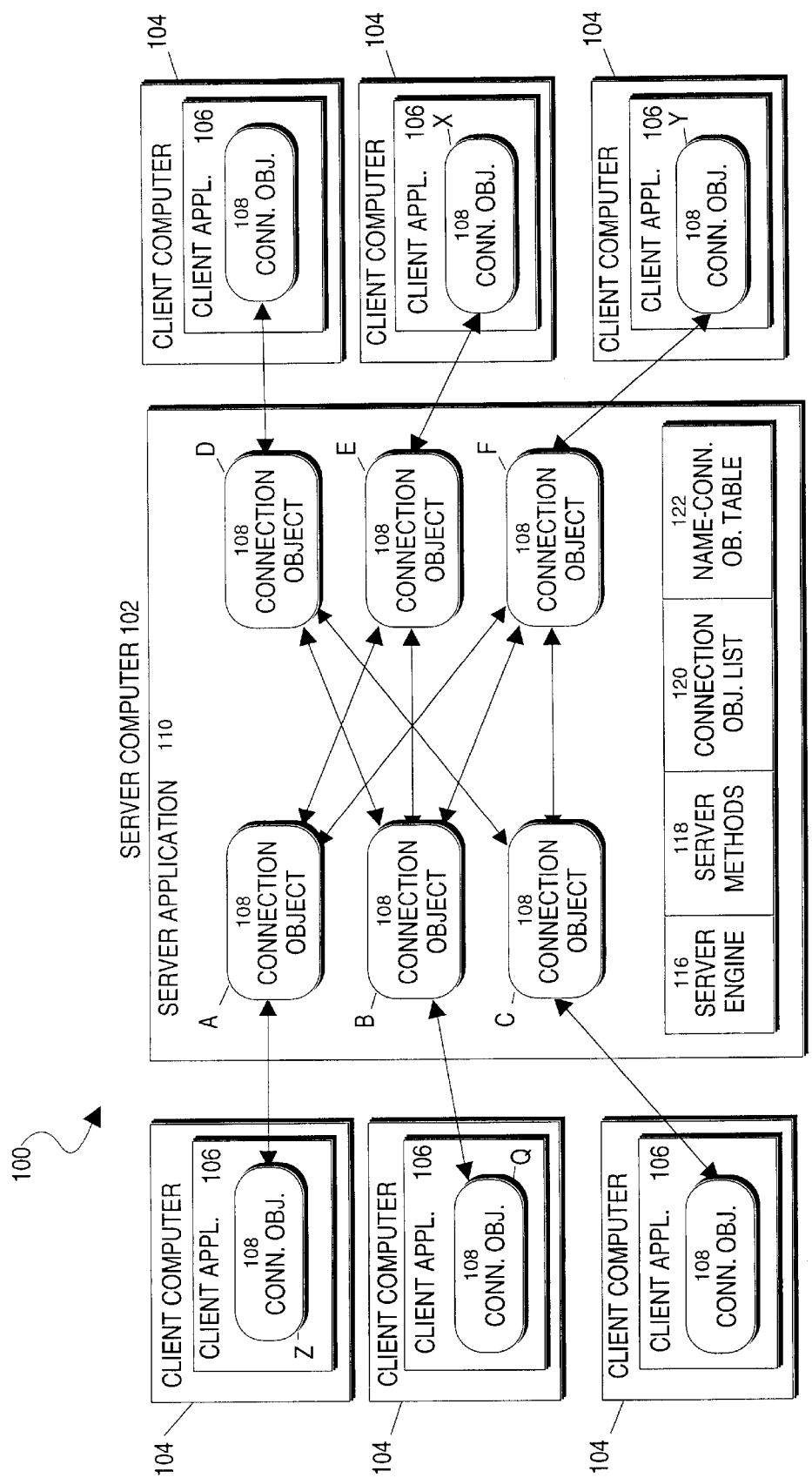
FIG. 1 is an illustration of a computer system providing a message architecture in accordance with the present invention.

Referring now to FIG. 1, there is shown the software organization of one embodiment of a computer system providing the multiplexing messaging architecture of the present invention. System 100 includes a server computer 102, and a number of client computers 104. Within each client computer there are one or more client applications 106. The server computer 102 includes a server application 110. Each client application 106 provides functionality as determined by an applications programmer; the specific functionality of each client application 106 is not germane to, nor limited by the present invention. Each client application has at least one connection object 108 for communicatively connecting to the server computer 102. The system 100 of FIG. 1, and particularly the server application 110, portions of the client application 106, and the connection objects 108, are created from development tools, including class definitions, for such objects, as further described below. Accordingly, a system 100 as illustrated in FIG. 1 is merely an instance of one aspect of the invention.

Figure 2:
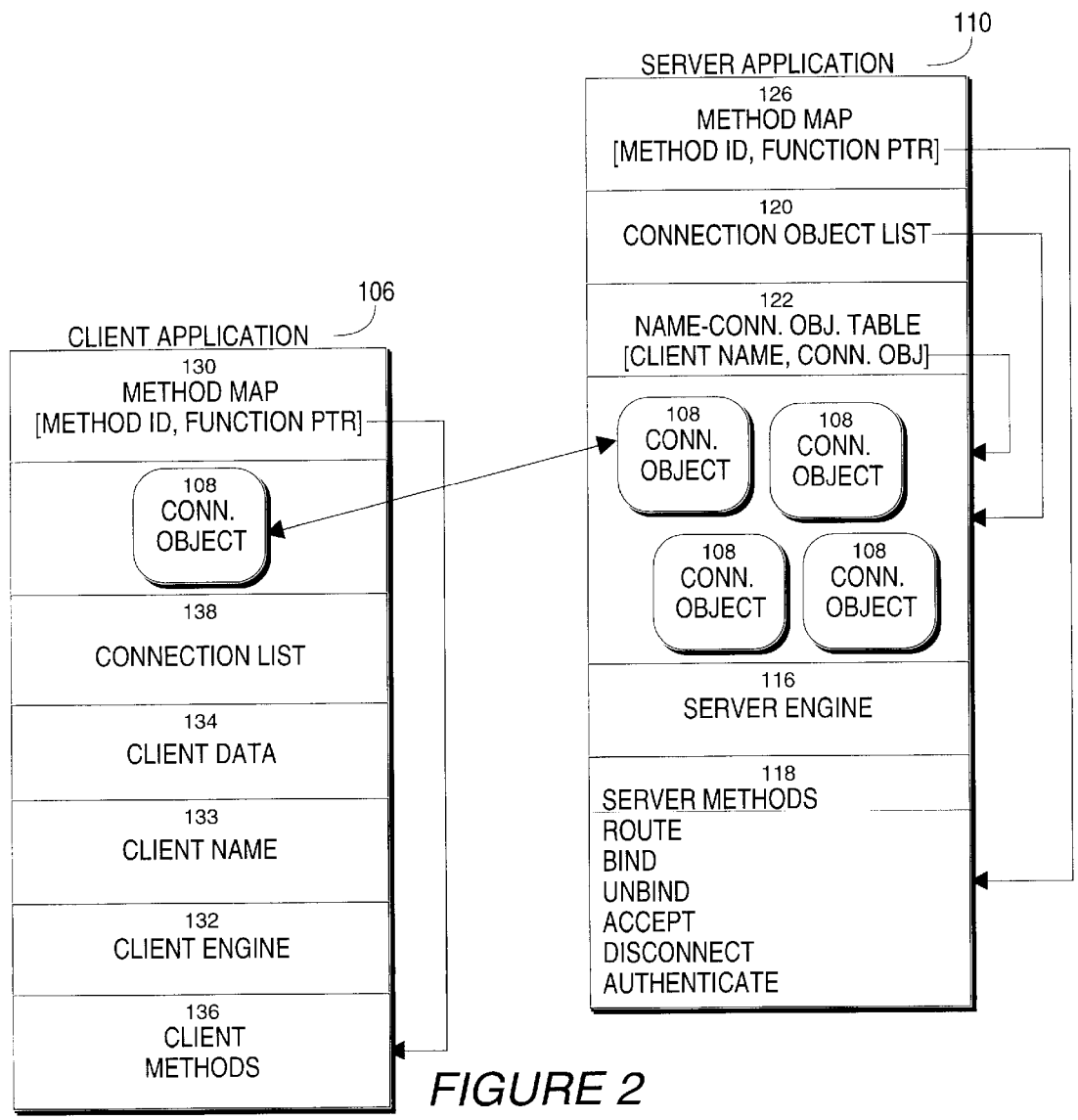
FIG. 2 is an object model for the server application and the client applications.

FIG. 2 illustrates the structure of the server application 110 and the client applications 106. Each client application 106 includes a method map 130 that associates method ids with function pointers. The method ids are received in messages 238. Client data 134 is locally maintained state for the client application 106. The client engine 132 is further described below. The client name 133 is the programmer defined name for the application.

The server application 110 also contains a number of connection objects 108, one for each connection object 108 in all of the client applications 106 presently connected to the server 110. Each of the connection objects, whether in a client application 106 or in the server application 110, have the same essential features. For clarity of description only then, a connection object in the server application 110, will be referred to as "server connection object 108" and a connection object in a client application 106 will be referred to as a "client connection object 108". When no preceding descriptor ("client" or "server") is used the reference is to be understood as describing connection objects 108 in general. In one embodiment, the main difference between server connection objects and client connection objects is that server connection objects include a binding table 214 (FIG. 3), and only an outbound message queue 236, whereas, client connection objects have no binding table 214, and an inbound message queue 250 in addition to an outbound message queue 236. The reasons for these differences will become apparent shortly.

The server application 110 maintains a list 120 of its server connection objects 108, with a handle or pointer to each such object. The server application 110 further holds a table 122 that relates a name of each client connection object 108 to one of the server connection objects 108, allowing the server application 110 to lookup and invoke a specific server connection object 108 from a name of a client connection object 108. The names of the client connection objects 108 are provided to the server application 110 by the client applications 106.

In FIG. 1, it can be seen that each client connection object 108 is communicatively connected with one server connection object 108. This connection is maintained on a particular network socket of both the client application 106 and the server application 110. While not illustrated in FIG. 1, the client computers 104 connect to the server computer 102 over a network, such as a local area network, wide area net, or preferably, over the Internet. For an Internet-based network connection, each client connection object 108 initiates and maintains a TCP-IP connection to a server connection object 108. The server connection object 108 is instantiated by the server application 110 at the time of the first connection by the client connection object 108 to the server application 110.

While there is only single physical connection between a client connection object 108 of a first client application 106 and a first server connection object 108, the first client application 106 is able to transfer messages to, and receive messages from, any other, second client application 106. This feature of the present invention is most easily understood by example.

In FIG. 1, various ones of the connection objects 108 have been labeled for convenience of reference. A first client connection object Z in a first client application 106, is connected with a first server connection object A. The server connection object A maintains a list that identifies for each second client application 106 with which the first client application 106 communicates, the second server connection object 108 connected to a client connection object 108 in that second client application 106. In this example, the server connection object A has the identity of server connection objects E and F, which are coupled to client connection objects X and Y, respectively. From this list, the server application 110, using a server engine 116, is able to route a message from the first client connection object A through the first server connection object A and to either the second server connection objects E or F, as indicated in the message from client connection object A. Similarly, client connection object Q is coupled to server connection object B, which also knows that it is can communicate with server connection object E in order to reach client connection object X.

The server engine 116 routes messages from client connection objects Z and Q destined for the client connection object X to the server connection object E, as they arrive, preferably asynchronously, at Z and Q. Server connection object E is able then to control the number of messages it sends to the client connection object X at any given time. In this manner, it can aggregate individual messages coming from client connection objects Z and Q into an optimally, or near optimally loaded network packet, and then send the packet to the client connection object X. Client connection object X then transfers the message contents to its client application 106 which can handle efficiently as a group if necessary, or individually.

This aggregation ability dramatically improves the bandwidth utilization for the real physical connections between the client applications 106 and the server application 110 and reduces latency induced delays by minimizing the number of round trips. In addition, it dramatically reduces the number of connections that would otherwise be needed to enable full communication between any number of the client applications 106. In the present invention, for N client applications, each supporting, for example, 1 connection object 108, to communicate with M other client applications, also supporting only one communication object 108, only N+M connections must be made between the client applications 106 and the server application 110. In contrast, in a conventional system (N*M) connections would have to be made. The ability for each client application 106 to support multiple connection objects 108 further increases the benefits of the present invention, allowing each client application 106 to multitask numerous connections to other client applications 106. The aggregation ability may be described as being multiplexed because individual messages from numerous sources are all compiled at a sending connection object 108 and transmitted at once to another receiving connection object 108. The receiving connection object 108 is then able to disaggregate the messages.

In order to best understand how the message aggregation of the present invention is provided, an explanation of the structure of the client and server applications 106, 110 and connection objects 108 is described. Next the routing of messages between client connection objects 108 and server connection objects 108 is described. The operation of the server engine 116 to message aggregation is then described, as is the operation of a client engine 132.

Connection Objects

Figure 3A:
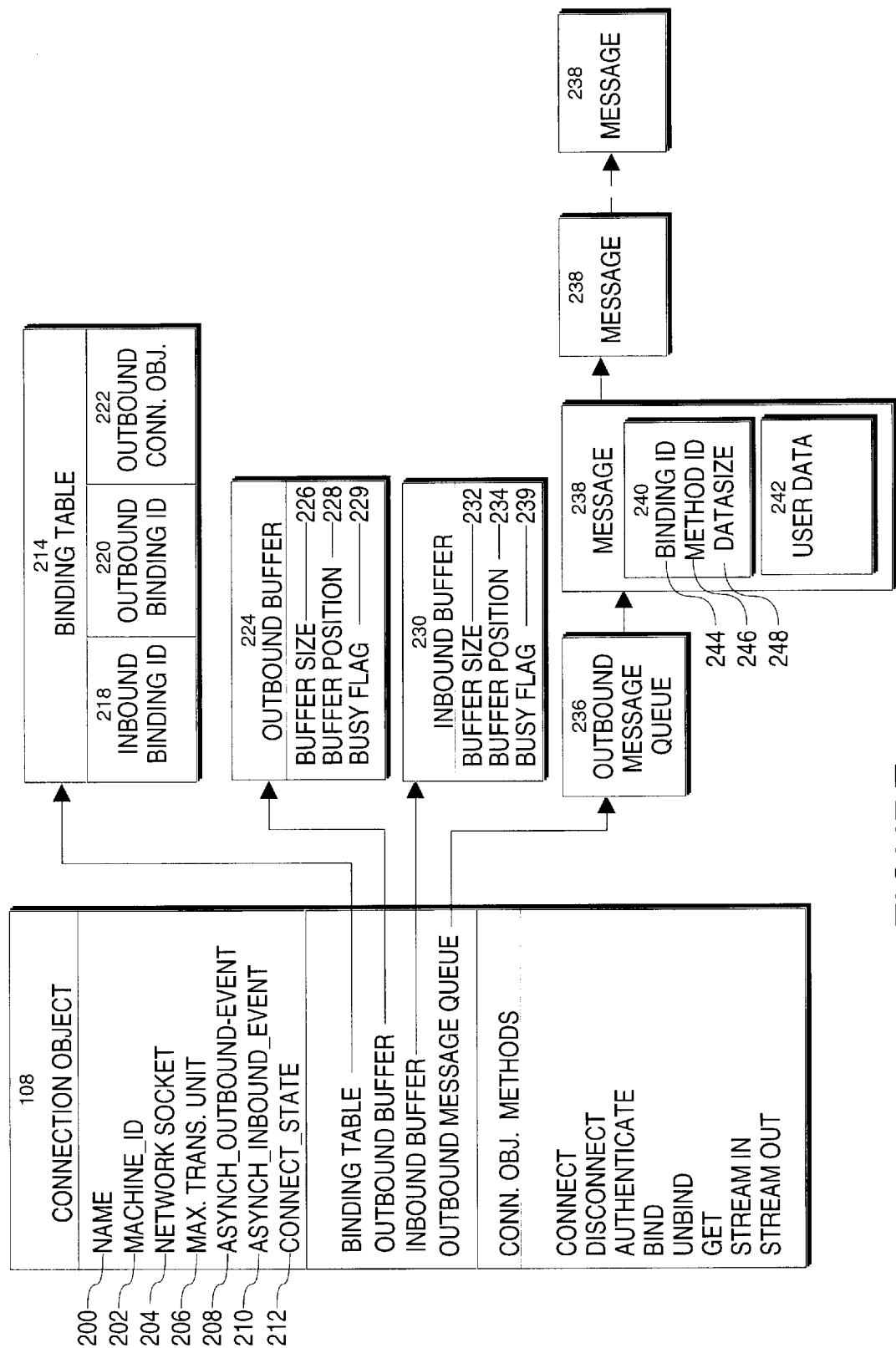
FIG. 3a is an object model for a server connection object.
Figure 3B:
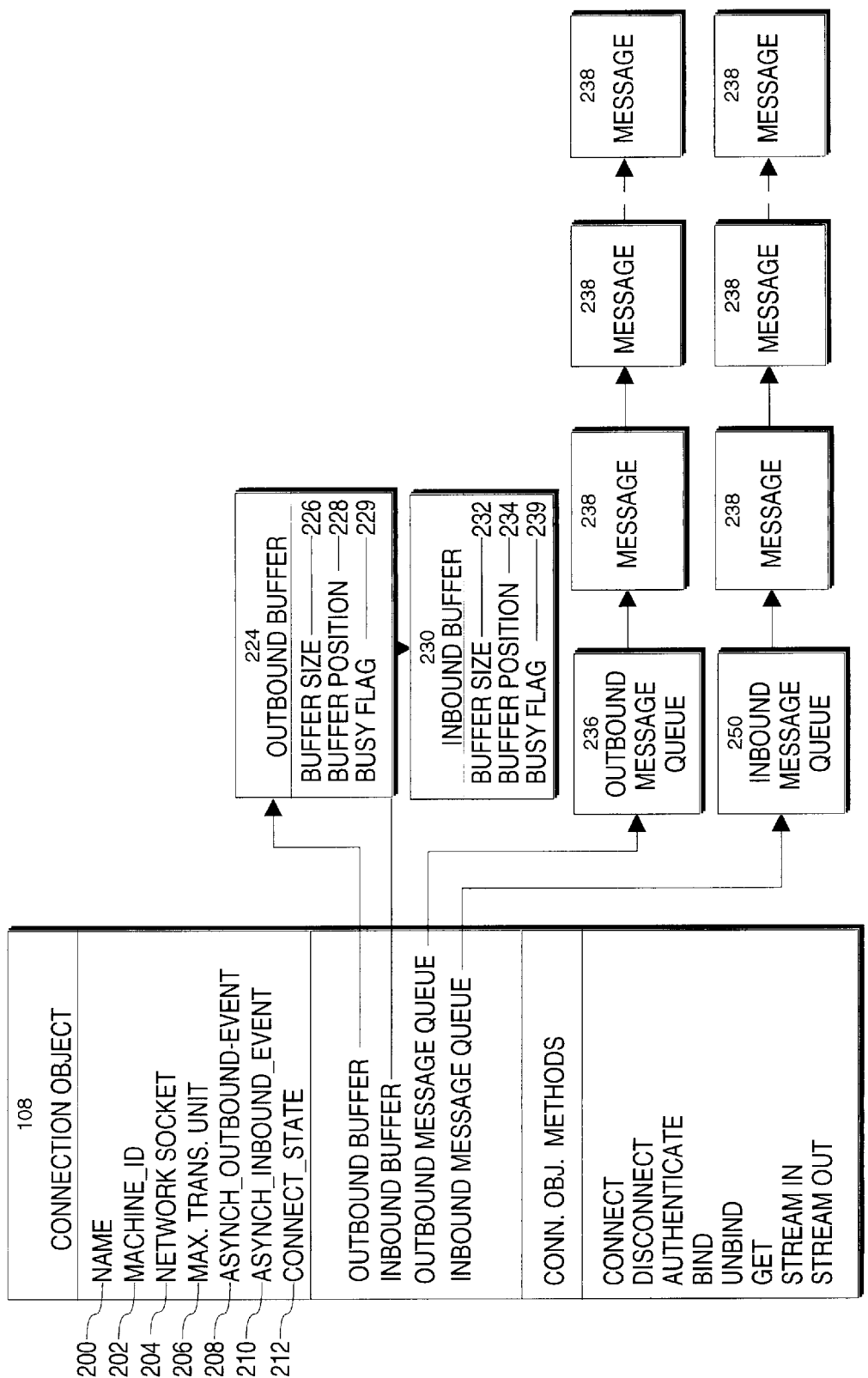
FIG. 3b is an object model for a client connection object.

Referring now to FIGS. 3a and 3b, there is shown in more detail the structure of a connection object 108 as used in the server application 110 and client applications 106 respectively. Except as set forth below the descriptions of the connection objects 108 applies to both of these application types. Each connection object 108 preferably has a name 200 provided by its originating application, and identifying it to the originating application. A machine id 202 is also stored, just in case two connection objects 108 have the same name (since they are not globally unique), so that name-machine id pair uniquely identifying the connection object 108. The name 200 and machine id 202 are primarily for identifying client connection objects 108, though in other embodiments, may be used by server connection objects 108.

A connection object 108 further stores a maximum transmission unit value (MTU) 206. The MTU indicates the maximum data size of a network packet for the type of network connection and protocol being used by the connection object 108. For example, for a TCP-IP connection over an Ethernet LAN, the MTU is 1460 bytes. The connection object 108 stores a handle to a network socket 208 holding the connection for the connection object 108. The MTU is determined by the server application 110 by querying the socket 208 for the current MTU of the connection held by the socket when that connection becomes connected (i.e. the client application 106 connects to the server application 110).

The connection object 108 also maintains state information 212 about its connecting state, whether it is disconnected, attempting to connect, connected, and authenticated.

The connection object 108 further has two buffers, an inbound buffer 230 and an outbound buffer 224. Both buffers have a buffer size 232, 226 respectively, preferably set by the connection object 108 to a multiple of the MTU value 206 when the connection object 108 is constructed. Each buffer 226, 232 also holds an index 228, 234 to a current position of reads or writes in the buffer.

The outbound buffer 224 is used by both the server and client connection objects 108 to hold and aggregate data from messages 238 that will be output to another connection object 108 to which the connection object 108 is connected. From the outbound buffer 224 message data is sent via the network socket to such other connection object 108. The inbound buffer 230 similarly holds data that is being received from the external connection objects 108 that the particular connection object 108 is connected to, as it is received. The server engine 116 or client engine 132 will then read from this inbound buffer 230 to create messages 238.

The connection object 108 includes handles to operating system events, an asynchronous outbound event 208, and an asynchronous inbound event 210. These events are used to signal the operating system that the connection object 108 is ready to send or receive data from its buffers.

Messages that the connection object 108 is to send are initially held in an outbound message queue 236, such as a linked list of messages 238. The connection object 108 reads messages 238 from its outbound message queue 236 into its outbound buffer 224 as they are available, and as there is space available in the outbound buffer 224, which as noted above, is sized by a multiple of the MTU to the maximum packet size. When the outbound buffer 224 is full or the outbound message queue 236 is empty, the outbound buffer 224 is flushed, thereby sending the messages 238 to a receiving connection object 108 connected to this connection object 108.

The client connection object 108 includes an inbound message queue 250 that is used to hold messages 238 as they arrive for processing the client application 116. The server connection objects 108 do not have to have an inbound message queue 250 (though in other embodiments they may) because they immediately transfer messages 238 received to other outbound queues 224. If a message 238 needs to be internally handled by the server application 110 is it immediately passed to the application.

Each message 238 is comprised of a message header 240 and user data. The message header 240 contains:

1) a binding id 244 (explained below);
2) a size value 248 indicating the size of the user data, in bytes; and,
3) a method number 246 that identifies a method (either in the server application 110, or in a client application 106).

The method number 246 is resolved by the receiving application, and used by the application to determine the appropriate internal functionality for handling the user data in the message. The user data itself may be a further message. In the preferred embodiment, the messages are structured as value objects are described in the related application referenced above.

Referring to FIG. 3a, a server connection object 108 further has a binding table 214. The binding table 214 is preferably its own separate object class, as illustrated in FIG. 3a and is an embedded member of the connection object. However, in other embodiments, the binding table 214 may be a direct member of connection object 108, such as an array. The binding table 214 stores information that establishes the "virtual connections" between two client applications 106. Noting that each server connection object 108 is directly connected with a client connection object 108, the binding table 214 of that server connection object 108 contains:

1) an inbound binding id field 218 that stores a binding id generated by the client connection object 108 coupled to the server connection object 108.
2) an outbound binding id field 220 that stores a binding id generated by the server application 110, and unique to the first client application 106 to the second client application 106 virtual connection.
3) a pointer 222 to server connection object 108 that is coupled to the client connection object 108 of the second client application 106.

Each binding in the binding table 214 uniquely associates an instance of a connection between a first client application 106 and a second client application 106. Note that the order of the elements in the binding table 214 may be changed.

More particularly, both the client connection objects 108 and the server application 110 create and assign binding ids. They use a number space that is divided so that binding ids generated by client connection objects 108 do not overlap with binding ids generated by the server application 110.

Figure 4:
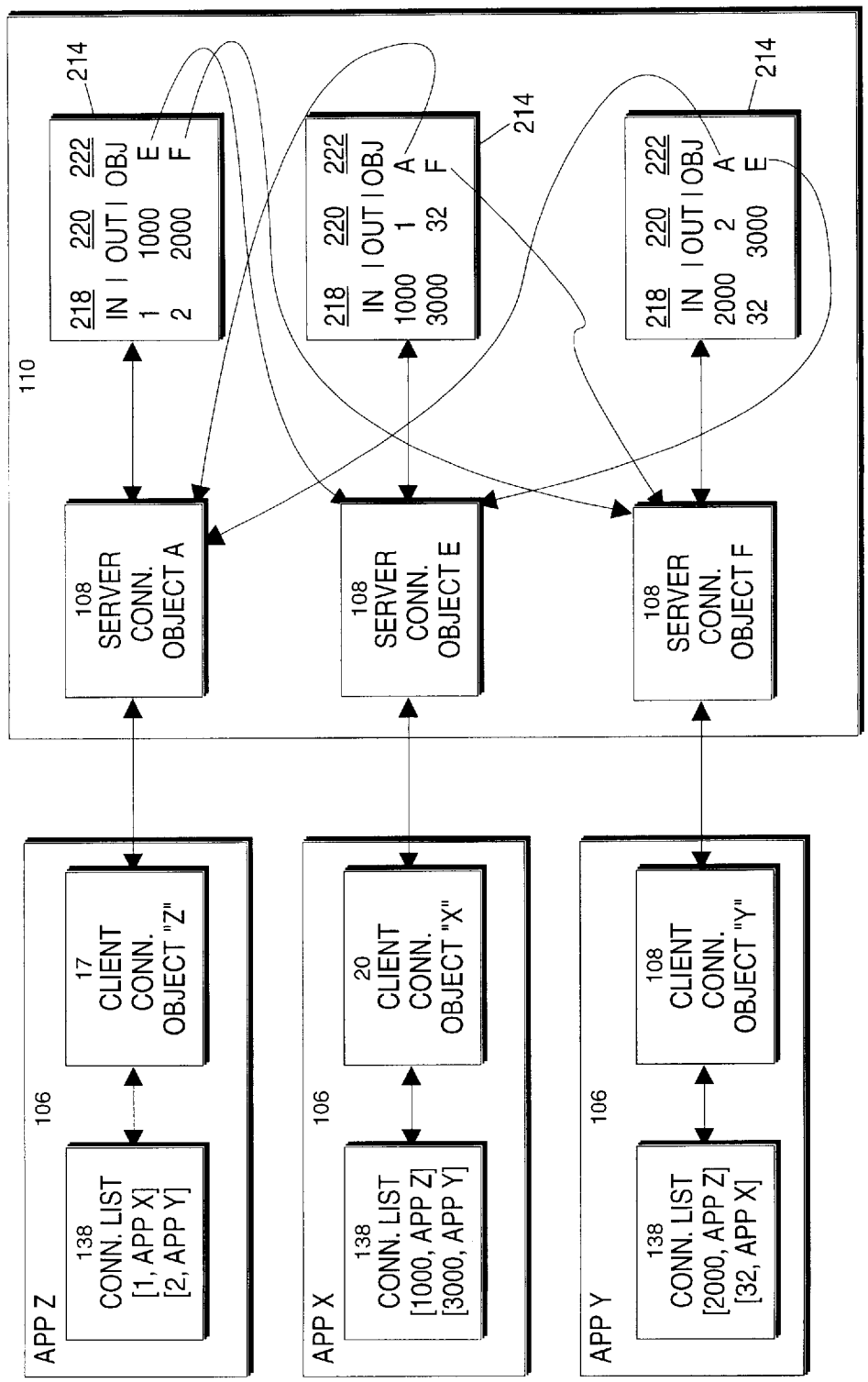
FIG. 4 is an illustration of the mapping of the binding tables for the server connection objects.

As described above, there are two server connection objects 108 interposed between any two client connection objects 108. The binding tables 214 of the two server connection objects 108 are what then define the virtual connection. FIG. 4 illustrates the mapping of binding ids in the binding tables 214.

For the purposes of this example, the connection objects 108 are named as in FIG. 1. In FIG. 4 there is shown a first client connection object Z and that will communicate with a client connection object X in one second client application 106 and another client connection object Y in another second client application 106. The client connection object Z is considered here to the "client" because it is requesting a service, and the second client connection object X is considered here to be the "agent" providing the service.

In addition, the client connection objects X, Y, and Z are part of their parent client applications 106, here named X, Y, and Z, respectively. Finally, each client application 106 here maintains a connection list 138 that maps the client assigned binding ids to the names (i.e. "App X", "App Y", and "App Z") of the client applications 106 that the particular client application 106 is communicating with, whether as an agent or a client. It should be noted that any client application 106, and hence any client connection object 108, may be both a "client" and an "agent" to the same, or different other client connection objects 108 at the same, or different times. This will be shown with respect to client application App Y, which is both an agent for App Z, and a client of App X.

In the server 110, there are three server connection objects, A, E, and F. Server connection object A is directly coupled via the network to client connection object Z. Server connection objects E and F are directly coupled to client connection objects X and Y, respectively. There is no direct network or other connection between the server connection objects 108 themselves. The following then describes the sequence of events that results in the pattern of connections and data in FIG. 4.

1) The client application App Z requests from the server application 110 a connection to client application App X. The client connection object Z generates a new binding id, here "1", and requests a connection from the server 110, passing in the binding id=1, and the name "App X". The client connection object Z also passes the binding id=1 back to the client application App Z, which stores it in connection list 138 in the mapping of [1,App X].

2) The server 110 creates a new server connection object A with an initially empty binding table 214. The binding table 214 of server connection object A will hold all of the bindings for client application App Z. To this binding table 214, the server 110 will store the binding id=1 received from connection object Z, and a server generated binding id, here "1000." The binding id numbers here are arbitrary, and selected to demonstrate that the client connection object generated numbers preferably do not overlap with (or are at least distinct from) the server generated ones. The binding id=1 is stored in the inbound binding id field 218, and the binding id=1000 is stored in the outbound binding id field 220 for the binding table 214 of server connection object A.

3) The server 110 determines the server connection object 108 that is coupled to client connection object X in client application App X. The server 110 does this by looking up the name received from Z, "App X" in its name to connection object table 114. Assuming "App X" is found, there is pointer to server connection object E. This pointer to E is stored in the outbound connection object field 222 of A's binding table 214.

4) The server 110 stores in the inbound binding id field 218 of the binding table 214 of E the binding id=1000 that it stored in outbound binding idfield 220 of A's binding table 214. The server 110 also stores a pointer to A in the outbound connection object field 222 of E's binding table 214.

5) The server application 110 creates a message 238 that requests App X to bind to App Z. The message 238 contains in its message header 240 the binding id=1000, and in the user data, the name "App Z". The server connection object E passes this message 238 to the client connection object X in client application App X.

6) The client application App X receives the message 238, and stores the binding id=1000, and name "App Z" in its connection list 138 as "1000, App Z". Client application App X knows that this virtual connection mapping is used to respond back to App Z, since the binding id is in the server side of the number space.

7) Now when App Z sends any message 238 to App Z, it includes in the message header 240 the binding id=1. The server application 110 will translate this binding id to binding id=1000 using server connection object A's binding table 214, and get the pointer to the "outbound" server connection object E. This is "routing" the message 238. One method for routing is the Route method described below.

Similarly, when App X needs to send a message 238 to App Z, it uses in the message header 140 the binding id=1000. Again, the server application 110 will translate this to binding id=1, and get the pointer to server connection object A, this time using server connection object E's binding table 214.

Client application App Z also uses the services of client application App Y. For this virtual connection, the client connection object Z has generated another binding id=2, and passed it to server connection object A. Server application 110 generated the binding id=2000, and stores in the binding tables of server connection object A, and server connection object F, which is coupled to client application App Y. Client application App Y stores in its connection list 138 this mapping [2000, App Z], if desired.

In the foregoing, client application App Z is only a "client" and did not provide services to any other client application 106. Similarly, client application App X is only an "agent" and provides services to client application App Z, as described.

In addition, client application App X also services client application App Y, and client application App Y is thus both a "client" and an "agent". The server connection objects E and F have entries in their binding tables 214 that reflect this relationship between the applications.

It is important to note that for the purposes of the invention, the mapping process can be entirely within the server connection objects 108; the connection list 138 maintained within the client applications is desirable, but only from the client applications' point of view. The connection list 138 aids the client application in keeping state for the specific virtual connection to the other client application 106. If it is not necessary to maintain state, then the client application may dispense with a specific mapping in the connection list 138, or with the connection list 138. In either case, the messaging architecture, and the ability to route messages between clients will still remain, since the necessary information resides in the server application 110 and its server connection objects 108.

To summarize, the mappings in the binding tables 214 are based on mirror mapping between the inbound and outbound binding ids for the respective client connection objects. The inbound binding id for "clients" is generated by the client connection object 108, and the outbound binding id for "clients" is generated by the server application 110. Contrawise, the inbound binding id for "agents" is the server generated value, and the outbound binding id is the client generated value. In this fashion, no state need be maintained within the client connection objects 108 themselves. It is for this reason that client connection objects 108 need not have any binding table 214 at all.

Message Aggregation
Server Engine

Figure 6:
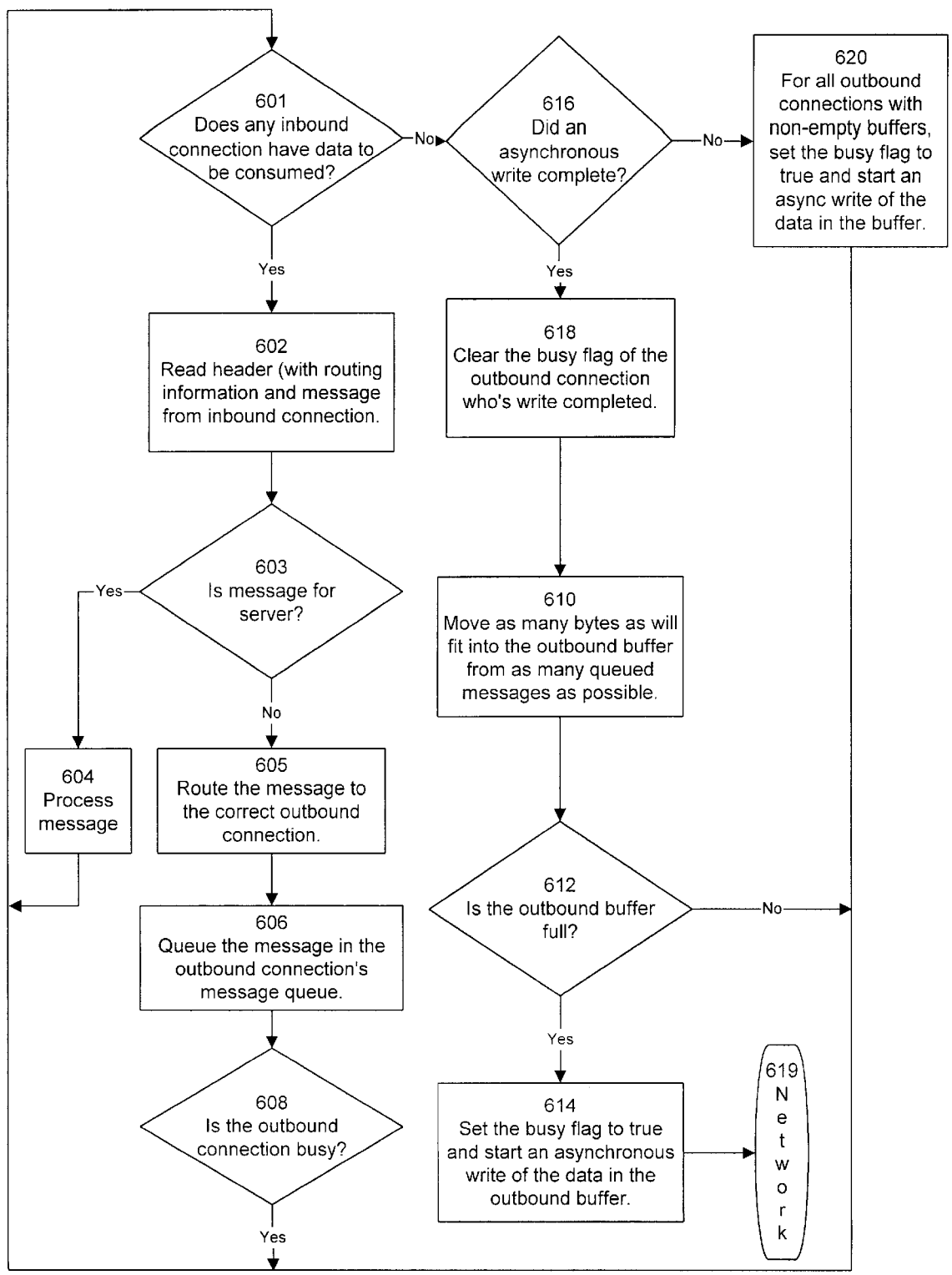
FIG. 6 is a flowchart for the operation of the server engine to control the aggregation and delivery of messages within the server application.

Referring now to FIG. 6, there is shown a flow diagram for the operation of the server engine 116 for receiving, routing, and aggregating messages. The server engine 116 is best described in terms of a state machine.

601: The operating system maintains a read queue identifying network socket connections for which there is data available for reading, each of these network sockets associated with a specific server connection object 108 in the server 110. Accordingly, the server engine 116 checks 601 on this queue, to determine if any data is available for reading 602. The data include messages being sent by a first client application 106, and its first client connection object 108.

602: When data is available, the read queue being non-empty, the server engine 116 gets a handle to the server connection object 108 coupled to the network socket, and reads this data into that server connection object 108. This data is in the form of a message 238, as described above, having a message header, and user data. The message 238 is built by the server connection object 108. The server connection object 108 that receives this message is here referred to as the first server connection object 108, and is communicatively coupled, via the network socket, to the first client connection object 108.

In the preferred embodiment, this process of building the message 238 is performed asynchronously. The message header 240 is of a fixed size, and the data size indicates the total number of user bytes of data. Accordingly, the server connection object 108 reads only as much data is available for the message 238 at any given time and waits on its network socket for remaining user data, according to specified data size. At some point, the message 238 is complete, and is held in the inbound buffer 230 of the server connection object 108.

603: The server engine 116 checks the binding id in the message header 240 of the received message 238. As stated, the binding id identifies the second server connection object 108 that is communicatively coupled to the second client connection object 108 of the second client application 106 that the first client application 106 intends to communicate with.

The binding id may also identify the server application 110 in order to have it perform some method (for example, Connect, or Disconnect) on the data. In one implementation the server application 110 reserves the binding id=0 to itself, so that it may handle requests from the client applications 106. If the binding id in the received message 238 equals 0, then the server engine 116 reads the method id from the message header, and passes the method id, and the user data to the server application 110 to process 604.

604: This state is reached when the message and data is for the server application 110, rather than a second client application 106. The server application 110 takes the method id from the message 238 and looks up a function pointer for the method in the method map 126. The server application 110 calls the function, passing in the user data, if any. The server engine 116 returns to checking 601 the read queue of the operating system for incoming messages.

605: This state is reached when the binding id in the message header 240 does not identify the server application 110; in this implementation, the binding id thereby does not equal 0. Here, the server engine 110 uses the binding id to determine the second server connection object 108 to which to pass the message 238. This routing process is as described above with respect to FIG. 4. Routing gives the server engine 116 a pointer to the second server connection object 108. The server engine 116 replaces the binding id in the message header 240 with the binding id from the outbound binding id field 220 of the binding table 214 of second connection object 108. This binding id uniquely identifies in the binding table of the second client connection object 108 the "virtual connection" for the first client connection object 108.

606: Using the obtained pointer, the server engine 116 then queues the message 238 to outbound message queue 236 of the second server connection object 108. At this point, the original message 238 from the first client application 106 is now ready to be sent to the correct second client application 106.

608: Once the server engine 116 queues a message 238, it determines whether outbound buffer 224 of the second server connection object 108 is busy, checking its busy flag 229. If the busy flag 229 is set, this means that the outbound buffer 224 is engaged in an asynchronous write of its data to the network socket, thereby sending the data to the second client connection object 108 to which the second server connection is coupled. If so, the server engine 116 returns to checking 601 the read queue of the operating system for available data. If not busy, the server engine 116 invokes the second server connection object 108 to begin 610 sending, if possible, its messages 238.

610: Here the server engine 116 invokes the second server connection object 108 to move data from messages 238 in its outbound message queue 236 into its outbound buffer 224. The second server connection object 108 will move as much data from the messages 238 as will fit into whatever space remains in the outbound buffer 224 at the time the buffer is loaded. One method for loading data into the buffer is the StreamOut method, further described below. There are three possible results from loading message data into the outbound buffer 224:

1) All of the messages 238 in the outbound message queue 236 are moved into the outbound buffer 224, and additional space remains in the buffer. This occurs when there is enough space remaining in the outbound buffer 224 at the time that it is called is greater than the total length of the messages 238.

2) Some number N of messages 238, N being equal to or less than all of the messages 238 in the outbound message queue 236, are moved into the outbound buffer 224, and no space remains. Here, the size of the N messages 238 is the same as the space in the buffer. The buffer is full. Messages 238 may or may not remain in the message queue 236.

3) Some number of, or portion of, messages 238 in the outbound message queue 236 are moved into the outbound buffer 224, the buffer becomes completely full, and some number of, or portion of, messages 238 remain in the outbound buffer 224. More particularly, there is space remaining in the buffer, but it is less than the size of the next available message 238 in the message queue 236. Thus, the next message 238 will not fit entirely in the buffer 224.

612: The server engine 116 checks whether the outbound buffer 224 is full, as set forth above. If the outbound buffer 224 is not full, then there is no need to send the messages 238 therein at this time. Rather, the server engine 116 returns to checking the operating system's read queue for more messages 238. This step allows the server engine 116 to aggregate in each server connection object's outbound buffer 224 the optimal, or near optimal, amount of data for sending to the client connection object 108 connected to the server connection object 108. The amount of data is optimized because the outbound buffer 224 is sized to a multiple of the maximum transmission unit for the network connection, and because the server engine 116 delays sending the data in the outbound buffer 224 until there are no more messages available to distribute to the server connection objects 108 from the operating system's read queue, or a given server connection object's outbound buffer 224 is full.

614: If the outbound buffer 224 of the second server connection object 108 is full, the server engine 116 sets the busy flag 229 of the outbound buffer 224 and initiates an asynchronous write of the data in the outbound buffer 224 to the network connection. Once initiated, the server engine 116 returns to checking 601 the operating system's read queue. Because these writes occur asynchronously, the server engine 116 does not pend on their completion, and thus multiple, effectively simultaneous, write outs by a number of second server connection objects 108 are possible. This indicated by the output lines from box 614 to the network 619.

616: This state is reached when the server engine 116 determines that there are no more messages in the operating system's read queue for distribution to server connection objects 108 (or to the server application 110 itself). Here the server engine 116 determines whether an asynchronous write has been completed. For each asynchronous write completion, the operating system stores an identifier of the process that performed the write in a write queue. The server engine 116 retrieves the top of queue to determine whether any further writes have been completed. The server engine 116 uses the identifier to determine the server connection object 108 that performed the write. The identifier may be opaque, as in UNIX, wherein the server engine 116 maps the identifier to a handle to the server connection object 108. Alternatively, the identifier may contain a handle to the server connection object 108 itself, as in the Windows NT operating system.

618: If a write has been completed by a server connection object 108, this means that its output buffer 224 is now cleared, and hence available for loading with data from more messages 238. Note that the server engine 116 was able to queue 606 messages 238 to the server connection object's outbound message queue 236 regardless of whether the outbound buffer 224 was full, and regardless of whether the server connection object 108 was writing out 614 the outbound buffer 224. Thus, as soon as the outbound buffer 224 is empty, there may be any number of messages 238 available for loading 610 into the outbound buffer 224, and writing out 614. Accordingly, the server engine 116 clears the busy flag 229 of the outbound buffer 224 of the server connection object 108 that has just completed a write. The server engine 116 then invokes 610 that same server connection object 108 to move messages 238 into its outbound buffer 224. The flow continues as described.

620: This state is reached if the operating system's write queue is empty, indicating that all writes have been cleared by the server engine 116, and if there are no incoming messages on the operating system's read queue 601. In this event, since no data is coming in, there is no need to hold up server connection objects 108 waiting to write out 614 messages in their outbound buffers 224. Accordingly, the server engine 116 traverses the list 120 of server connection objects 108, and for each one, checks whether the outbound buffer 224 is non-empty, and if so, sets the busy flag 229 of that outbound buffer 224, and initiates an asynchronous write. Once this list is completed, the server engine 116 returns to checking the operating system's read queue.

In this manner, the server engine 116 will assemble in the outbound message queue 236 of each server connection object 108 messages 238 from any other server connection object 108, and hence any client application 106. All messages 238 are received asynchronously by the server connection objects 108, and properly routed to specific other server connection objects 108, and delivered asynchronously to client applications 106.

Client Engine

Figure 7:
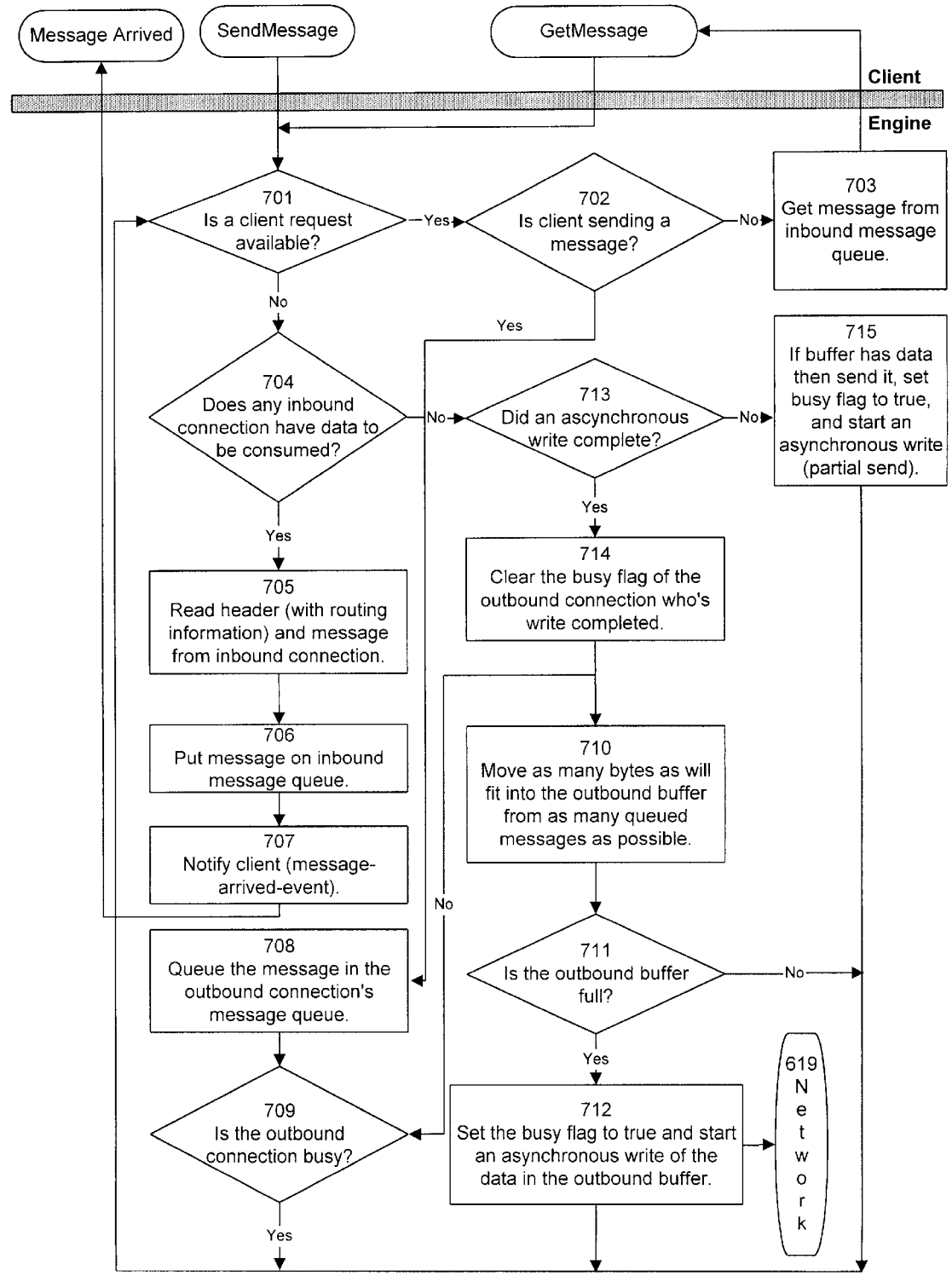
FIG. 7 is flowchart for the operation of a client engine to control the aggregation and delivery of messages within a single client application.

Referring now to FIG. 7 there is show a flow diagram of the operation of a client engine 132 to aggregate and distribute messages to its client connection object 108. In FIG. 7, the client engine 132 is event driven, and operates asynchronously. The client engine 132 responds, in this implementation, to two events from the client application 106, SendMessage and GetMessage, and get generates an event to the client application, Message Arrived. Alternatively, a non-event driven, synchronous implementation may also be used, as would be apparent to those of skill in the art.

701: The client engine 132 checks whether a client request is available, the request being either a SendMessage or GetMessage event.

702: Here the client engine 132 tests whether the client application 106 is sending a message.

703: If the client is not sending a message, but rather requesting that a message be retrieved, then the client engine 132 removes a message 238 from the inbound message queue 250 of client connection object 108 in the client application 106. The message 238 is passed back to the client application 106, which uses the method id 246 to determine, via its method map 130 which method 136 to call to handle the user data 242 in the message 238. Again, the specific functionality that is produced by the client application 106 in response to any message 238 is not germane to the invention or any of its implementations. In one preferred embodiment, the message 238 is structured as a value object, as described in the related application referenced above, thereby eliminating the need for the client application 106 to unmarshall the data in the message 238. Rather in this embodiment, the client application 106 is able to directly operate on the data in the message, thereby improving overall performance in handling, and if necessary, responding to the message by sending return data back to the sending client application 106 or other destination.

704: This state is reached if there is no current client request pending. In this state, the client engine 132 determines whether there is data to be read from the inbound buffer 230.

705: If there is data to be read from the inbound buffer 230, the client engine 132 reads the data in, and identifies in the message header 240 the binding id 244. The message 238 is preferably structured as a value object as described in the related application.

706: The client engine 132 moves the message 238 to the inbound message queue 250. This will allow the client engine 132 to later retrieve the message 238.

707: The client engine 132 generates a MessageArrived event to the client application 106. The client application 106 will in response generate a GetMessage event when it needs to retrieve the message.

708: This state is reached if the client engine 132 determines 702 that the client application 106 is sending a message (i.e., a SendMessage event is received). In this case, the client application 106 passes a handle to the message 238 to the client engine 132, which then places the message 238 in the outbound message queue 236 of the connection object 108.

709: Once queued, the client engine 132 determines whether the outbound buffer 224 of the client connection object 108 is busy by checking the busy flag 229. If the outbound buffer 224 is busy, this means that the buffer is currently writing its data out to the network, and hence to a server connection object 108 in the server application 110. In this case, the client engine 132 returns to checking 701 for events from the client application 110.

710: If the outbound buffer 224 of the client connection object 108 is not busy, then the client engine 132 invokes the client connection object 108 to move data from messages 238 in its outbound message queue 236 into its outbound buffer 224. In one embodiment, this is done with the StreamOut method of the connection object 108. The client connection object 108 will move as much data from the messages 238 as will fit into whatever space remains in the outbound buffer 224 at the time the StreamOut method is called. Again, the resulting consumption of space in the outbound buffer 224 is as described above for the server engine 116.

711: The client engine 132 checks whether the outbound buffer 224 is full. If the outbound buffer 224 is not full, then there is no need to send the messages 238 therein at this time. Rather, the client engine 132 returns to checking 701 the client application 106 for more events. This step allows the client engine 132 to aggregate in the client connection object's output buffer 238 the optimal, or near optimal, amount of data for sending to the server connection object 108 connected to that client connection object 108. As before, the amount of data is optimized here because the outbound buffer 224 is sized to the maximum transmission unit for the network connection to the server connection object 108, and because the client engine 132 delays sending the data in the outbound buffer 224 until there are no more messages available from the client application 106 to send to the server connection objects 108, or the client connection object's outbound buffer 224 is full.

712: If the outbound buffer 224 of the client connection object 108 is full, the client engine 132 sets the busy flag 229 of the outbound buffer 224 and initiates an asynchronous write of the data in the outbound buffer 224 to the network connection. Once initiated, the client engine 132 returns to checking 701 for events from the client application 106. Because these writes occur asynchronously, the client engine 132 does not pend on their completion, and thus can continue to load more messages into the outbound message queue 238, or retrieve messages 238 from the inbound message queue 250. If the messages 238 are created using the value objects of the related application, then no marshalling routines are needed in order to marshall the data for transmission over the network.

713: This state is reached when the client engine 132 determines that there is no more data in the inbound buffer to be retrieved and read into messages 238. In this case, the client engine 132 determines whether an asynchronous write has been completed by the client connection object 108. For each asynchronous write completion, the operating system stores an identifier of the process that performed the write in a write queue. The client engine 132 retrieves the top of queue to determine whether the client connection object 108 has completed the write out of the outbound buffer.

714: If the write has been completed by the client connection object 108, this means that its output buffer 224 is now cleared, and hence available for loading with data from more messages 238. Note that the client engine 132 was able to queue 708 messages 238 to the outbound message buffer 224 of the client connection object 108 regardless of whether the outbound buffer 224 was full, and regardless of whether the client connection object 108 was writing out 712 the outbound buffer 224. Thus, as soon as the outbound buffer 224 is empty, there may be any number of messages 238 available for loading 710 into the outbound buffer 224, and writing out 712. Accordingly, the client engine 132 clears the busy flag 229 of the outbound buffer 224 of the client connection object 108 that has just completed a write. The client engine 132 then invokes 710 on its client connection object 108 to move messages 238 into its outbound buffer 224. The flow continues as described.

715: This state is reached if the operating system's write queue is empty, indicating that all writes have been cleared by the client engine 132, and if there are no incoming events from the client application (701). In this event, since no events are coming in, there is no need to hold up the client connection object 108 to wait to write out 712 any messages 238 in its outbound buffer 224. Accordingly, the client engine 132 checks whether the outbound buffer 224 of the client connection object 108 is non-empty, and if so, sets the busy flag 229 of the outbound buffer 224, and initiates an asynchronous write. The client engine 132 returns to checking 701 whether any events have been received from the client application.

Overall System Flow

Figure 5:
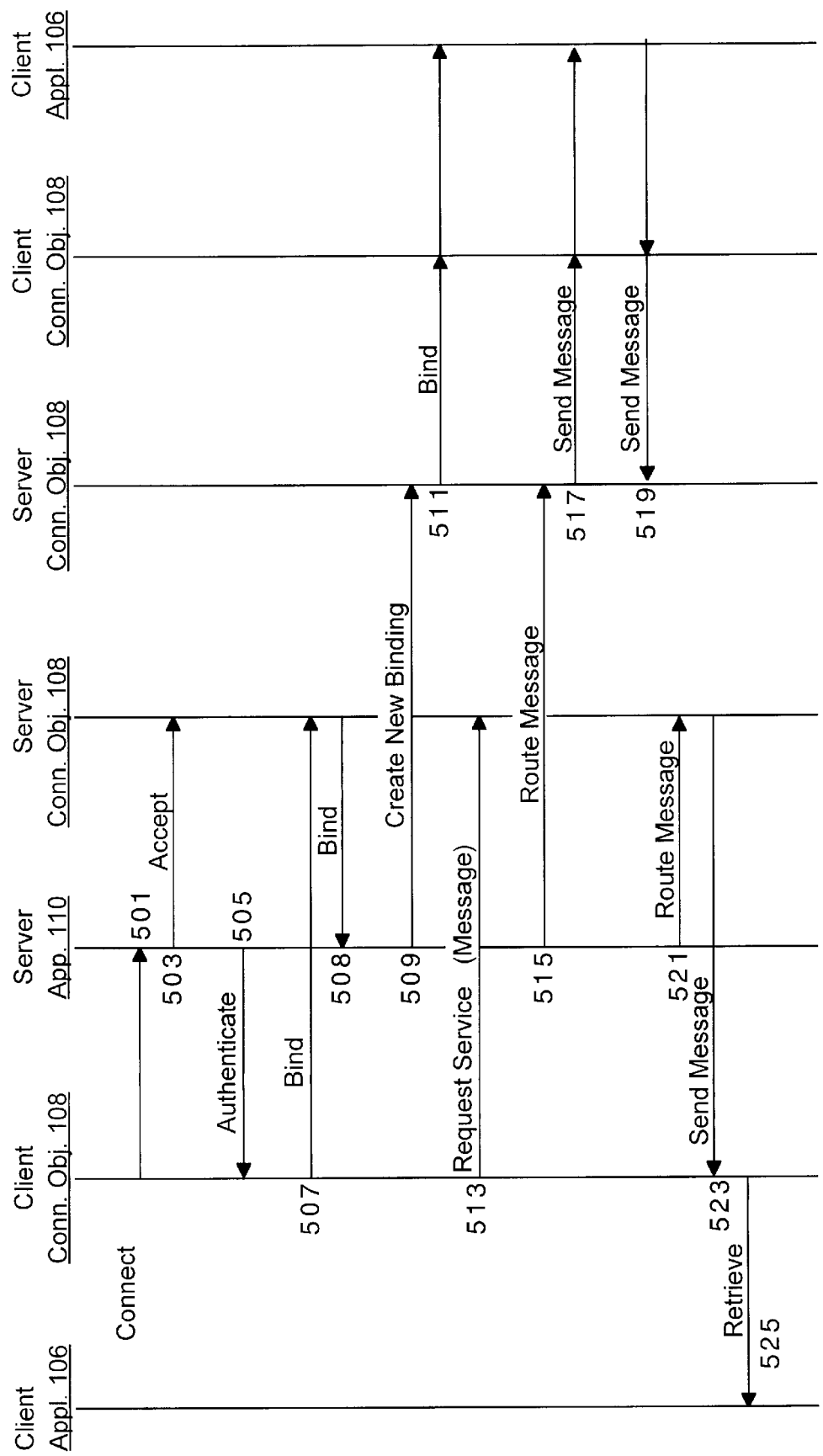
FIG. 5 is an event flow diagram illustrating message routing between two clients.

Referring now to FIG. 5, there is shown an event trace for one embodiment of the messaging architecture of the present invention.

501: The client application 106 initiates a connection with the server application 110 getting a network socket from the local operating system, and queuing via its client engine 132, a message 238 in the outbound message queue 236 of its client connection object 108 to connect with the server. The client application 106 uses its Connect method, receiving the network socket from the client application, and establishing a connection to the network at that socket.

The client connection object 108 sends the message 238 when the outbound buffer 224 is full, or no other messages 236 are incoming, as managed by the client engine 132. The message data is received by the server engine 116 and passed to the server application 110.

503: The server application 110 accepts the connection by instantiating a new, first server connection object 108. This server connection object 108 will have in its binding table 214 all of the bindings between the client connection object 108 and its target client applications. This first server connection object 108 will be the inbound server connection object 108 for the client connection object 108 when the latter is sending messages 238, and will be the outbound server connection object 108 when the client connection object 108 is to receive messages 238.

505: The server application 110 then authenticates the client application 106, using its authenticate method. The server engine 116 queues a message 238 to the first server connection object 108 (not shown), which sends the message 238. This establishes that the client application 106 has permission to use the server application 110.

507: The client application binds to the second client application 108. The client connection object 108 sends a message to the server application 110 requesting a bind, and specifying the name of the second client application 108 to be bound to, a client generated binding id for the connection, and the machine id 202 of the computer executing the client application 108.

508: The server application 110 via the server engine 116 receives the message data of the message 238 inbound message queue 250 of the inbound server connection object 108. The server engine 116 determines that a bind request is being made, and passes the message to the server application 110.

509: To create the binding, the server application 110 looks up the pointer to the outbound server connection object 108 for that second client application 106 in its name-connection object table 122. The server application 110 generates an outbound id, and stores it, along with the client generated binding id, in the binding table 214 of this outbound server connection object 108. The server application 110 need not return its generated binding id to the first client application 106. These steps are taken by the server application's Bind method.

511: The server application 110 completes the bind by sending to the second client application 106 a message with the newly generated outbound id, machine id for the first client application, the name of the first client application, and an instance id that identifies the first client's instance of the connection, with a bind request. The instance id is a global connection identifier managed by the server 110, assigned to each connection object 108, allowing each client application 106 to maintain multiple physical connections to a specific second client application 106. The server application 110 creates the new message 238, and the server engine 116 queues the outbound message queue 224 of the outbound server connection object 108 (FIG. 6, block 605). This queue will be cleared in the normal operation of the server engine 116 as described above.

The client application 106 will receive this message from the inbound message queue 250 of its client connection object via its client engine 132 (FIG. 7, block 703). The client application 106 executes its Bind method, thereby updating the binding table 214 of its client connection object 108.

At this point the binding is complete. The first and second client applications 106 hold enough internal state in their binding tables 214 to send and receive messages 238 to each other, and the binding tables of the server connection objects 108 hold enough state to route messages between these two clients specifically.

513: At some point the first client application 106 requests data/service from the second client application 106 (the direction of the request here is actually immaterial, as either client application may initiate a request to, or receive data from, any other client application. The use of "first" and "second" then is merely to clearly identify the operative elements in these examples).

The client application 106 creates the message 238, and the client engine 132 queues the message in the outbound message queue 238 of the first client connection object 108. The message 238 will specify in its message header the binding id of the client application 106. Again, this binding id was generated by the first client application 106 to uniquely (within the client) specify the virtual connection to the second client application 106.

It should be noted here that once the client application creates the message 238 and the client engine 132 queue it to the client connection object 108, the application is free to continue with its operations. The client engine 132 will aggregate this message 238 with any other available messages 238 into one network packet in order to maximize the use of the virtual, and physical connection between the client and the server. The operation of the client engine 132 is described with respect to FIG. 7. Further, because the client application 106 operates asynchronously, it does not wait until the second client application 106 responds to the request for service. Rather, it will continue its operations, and receive a reply, if necessary in the course of handling any incoming messages 238 via the client engine 132.

515: The server application 110 receives the message data, and with the server engine 116 routes the message 238 to the appropriate outbound server connection object 108, placing the message 238 in the outbound message queue 224 of the outbound server connection object 108.

To do this, the server engine 116 reads the binding id from the message header 240 and looks-up the outbound binding id in the binding table 214 of the inbound server connection object 108, along with the pointer to the outbound server connection object 108. The server engine 116 replaces in the message header 240 the client binding id with the server-generated outbound binding id. This is so the second client application 106 will be able to send messages 238 back to the first client application 106.

The server engine 116 queues the altered message 238 on the outbound message queue 224 of the outbound server connection object 108. Again, this process is done using the aggregation of messages previously described, so that the outbound server connection object 108 can send an optimized network packet of data to the client connection object 108. In this example only one message 238 is being discussed merely for the sake of clarity.

517: The outbound server connection object 108 sends the message 238 to the client connection object 108 of the second client application 106. The message 238 loaded into the outbound buffer 224 of the outbound server connection object 108, and sent asynchronously when either that buffer is full (with this message, and any other messages), or when there are no more incoming messages 238 to be routed.

The second client application 106 receives the message 238 as data in its inbound buffer 230, and as described with respect to the client engine 132, proceeds to reconstruct the data into a message 238, placing it on the inbound message queue 250 of the client application 106. In an event driven embodiment, the client engine 132 posts a MessageArrived event, which in turn causes the client application 106 to instruct the client engine 132 to obtain the message from inbound message queue 250 and pass it to the client application 106 for handling.

The second client application 106 reads the method id from the message header 240 and performs the request service identified by the method id. Obtaining the message and its data may be done with the Get method described below.

519: The second client application 106 responds with a single message 238 back to the first client application 106 providing the requested data, queuing this message 238 with any other messages 238 to any other client application 106. This is done by sending the message 238 to second server connection object 108, which is now considered the inbound server connection object 108 for the second client application 106. This message 238 specifies in its message header 240 the binding id assigned by the server application 110 for this particular virtual connection between the client applications. This allows the server application 110 to correct route the return message back to the first client application 106.

521: As before (515) the server application 110 receives the message data, and with the server engine 116 routes the message 238 to the appropriate outbound server connection object 108, here the first server connection object 108, placing the message 238 in the outbound message queue 224 of the first server connection object 108. The server application 110 uses the binding id in the message header 240 and from the binding table 214 of the second server connection object 108, gets the pointer to the first server connection object. The server engine 116 then queues the reply message 238 to the first server connection object 108.

523: The first server connection object 108 sends the message 238 to the first client connection object 108. The message data is received by the client engine 132 which constructs the message 238 and places it in the inbound message queue 250 of the first client connection object 108 (FIG. 7, blocks 705–706), notifying the client application 106 of the message 238.

525: The client application 106 retrieves the message 238 and handles it as desired.

In one preferred embodiment, a client application 106 further optimizes the message delivery as follows. In the previous example, with a single message 238 returned to the first client application 106, assume that original message 238 from the first client application 106 requests a particular item of data held by the second client application 106, for example, the current stock price of a particular company. Assume further that there are 1,000 client applications 106, that, like the first client application 106, are all requesting this item of data at about the same time. In the first embodiment described here, the second client application 106 would separately respond to each and every one of the 1,000 first client applications 106. These messages 238 would be aggregated in the manner described above by the client engine 132. The server engine 116 would then route each of these separately to the correct outbound server connection objects 108.

As an optimization, then, the second client application 106, in replying to all of the first client applications 106, creates a message 238 in which the user data contains the data item to be sent and a list of the binding ids identifying the outbound server connection objects 108 for the second client applications 106. This single message 238 is sent to the server 110, with a message header 240 including binding id for the server application 110, and method id identifying a method to disaggregate the user data and create the individual messages. This method is faster because the server 110 can more quickly create the necessary messages 238 from the list, rather than handling each message individually. One implementation of such a method is the SendMultiple method described below.

Server Methods

The server application 110 provides a number of methods to manage the connections of client connection objects 108. Each method has a local unique method id that is used by the server application 110 in its method map 126 to select the appropriate method for handling a received message 238. The server application 110 reads the received message 238 to extract the input parameters, if necessary for passing to a method. The implementations for these methods are merely exemplary in order to highlight the significant behaviors to be achieved. Other implementations may also be suitably defined to achieved the purposes of the methods. These methods are as follows:

Accept

Purpose: to establish a network connection between a requesting client connection object 108 and a new server connection object 108 in the server application 110.

Input: a network socket 204.

Output: message with user data: a pointer to server connection object.

Implementation:

1) Instantiate a new server connection object 108, passing in the network socket address.
2) Set the connect state 212 as "connecting."
3) Set MTU by querying the TCP interface what the MTU is on this connection.
4) Instantiate and initialize asynch inbound event 210, and asynch outbound event 208.
5) Instantiate binding table 214 for new server connection object 108.
6) Instantiate and initialize inbound buffer 230 and outbound buffer 224. Buffer size equals MTU, buffer position equals 0.
7) Add new server connection object 108 to connection object list 120.

Once the server connection object 108 is added to the list 120, it ready to receive messages 238 from other connection objects 108. In particular, the server connection object 108 may be used to authenticate the client application 108.

Disconnect

Purpose: to disconnect a client application 106 from the server application 110.

Input: message with user data: a network socket between the client connection object 108 and a server connection object 108.

Output: success or error code

Implementation:

1) Translate network socket to pointer to server connection object 108 connected to client application 106.
2) Remove binding id from binding table 214 of server connection object 108.
3) Lookup server connection objects 108 listed in binding table of current server connection object 108, and remove binding id of client application 106.
4) Destruct server connection object 108 connected to the client connection object 108.

Authenticate

Purpose: to establish that a user of a first client application 106 has permission to access the server application.

Input: message with user data: User name, credentials (password, account no., and the like).

Output: success or error code.

Implementation:

1) Verify user name, credentials using authentication protocol. Any authentication protocol may be used, for example, Kerberos, DSA, RSA, and the like.
2) If user verified, set connect state 212 as "connected," updated user name, machine id 202 in server connection object 108 connected with client application 106.

Bind

Purpose: to establish a virtual connection between a first client application 106 and a second client application 106, "binding" them together.

Input: message with user data: name of a client application 106 or client connection object 108).

Output: success or error code.

Implementation:

1) Lookup outbound (second) server connection object pointer in name-connection object table 122.
2) Generate binding id for virtual connection between the client application 106. This binding id uniquely associates the client connection object 108 that is requesting the bind with the client connection object 108 that is named.
3) Create a new binding in the binding table 214 of the inbound connection object 108 that is coupled to the first client application 106. Store the client generated binding id in the inbound binding id field 218, the server generated binding id in the outbound binding id field 220.
4) Store in the binding table 214 of the outbound connection object 108, the binding id provided by the client in the outbound binding id field 220, and the server generated binding id in the inbound binding id field 218. Example:
   ConnObj.BindTable.SetBind(in_bind, out_bind).
4) Create a new message 238:
   message header 240:
     binding id 244: generated outbound binding id
     method id: bind
     data size: sizeof(user data)
   user data 242:
     user name, name of client application 106
     client machine_id.

The resulting message will be queued at the outbound (second) server connection object 108 that is connected to the client connection object of the named client application 106. The user name may be used by the second client application 106 to determine permissions, and maintain any necessary state for the particular user.

Unbind

Purpose: to release a virtual connection between two client applications 106 and their client connection objects 108. Removes the binding id and its mappings from the binding tables 214 of the server connection objects 108 connected to these client applications 106.

Input: message with user data:

a) binding id to destroy; this is the binding id generated by the client application 106.
b) connection object pointer (previously retrieved).

Output: success or error code.

Implementation:

1) Remove binding id from binding table 214 of specified connection object 108. Example:
   ConnObj.BindTable.RemoveBind(bind_id).
2) Remove mirror image binding from binding table 214 of outbound server connection object 108 referenced in current binding table 214.

Route

Purpose: to route a message 238 from an inbound (first) server connection object 108 to an outbound (second) server connection object 108 in order to pass the message 238 ultimately from a first client application 106 to a second client application.

Input: a message.

Output: success or error code.

Implementation:

1) Read message header 240 to determine binding id 244.
2) In binding table 214 of the server connection object 108 that received the message 238, lookup:
   a) the binding id in the outbound binding id field 220; and,
   b) the outbound connection object pointer 222.
3) Remove the binding id 244 from the message header 240, and insert the binding id obtained from the binding table 214.

SendMultiple

Purpose: to route a message 238 from an inbound (first) server connection object 108 to a list of outbound (multiple) server connection objects 108 in order to pass the message 238 ultimately from a first client application 106 to multiple client applications.

Input: a message.

Output: success or error code.

Implementation:

1) Read message header 240 to determine if for server binding id 244.
2) Read array of outbound binding id's from start of message body.
3) Read remaining body of message (this is the message that the client wants to forward to multiple connections).
4) Call Route for each binding specified in step 2 on the message read in step 3.

Connection Object Methods

Each connection object 108 includes a number of methods for managing its connections, and for handling messages 238. The implementations for these methods are merely exemplary in order to highlight the significant behaviors to be achieved. Other implementations may also be suitably defined to achieve the purposes of the methods. These methods are as follows:

Connect

Purpose: to establish a network connection between a client connection object 108, and a server connection object 108.

Input: network address specified by client application 106, user name, user credentials.

Output: success or error code.

Implementation:

1) Post a connect message to the operating system at the network address, get a handle to a network socket.
2) When the connection completes, report success, and initiate authentication of the client application 106.
3) If not successful, return an error.

Disconnect

Purpose: to remove a connection between the client application 106 and the server application 110.

Input: network socket.

Output: none.

Implementation:

1) Clear outbound buffer by initiating write out. Pend on completion.
2) Send a disconnect to the operating system, the operating system closes the network socket.

Authenticate

Purpose: to establish that a user of the client application 106 has permission to access the server application 110.

Input: User name, credentials (password, account no., and the like)

Output: success or error code.

Implementation:

1) Verify user name, credentials using authentication protocol. Any authentication protocol may be used, for example, Kerberos, DSA, RSA, and the like.
2) If user verified, set connect state 212 of client connection object 108 as "connected," updated user name, machine id 202 in client connection object 108.

Bind

Purpose: to establish virtual connection between the client connection object 108 in this client application 108, and a client connection object 108 in any other second client application 106.

Input: binding id, name of second client application 106.

Output: no return.

Implementation:

1) Create a new message 238:
    message header 240:
        binding id 244: server application binding id.
        method id: bind
        data size: sizeof(user data)
        user data 242:
            client generated binding id for this virtual connection
            name of second client application 106
2) Send message 238.

When the server engine 116 receive this message 238, it will process it with its Bind method, as set forth above, since the binding id 244 of the message header 240 identifies the server application 110.

Unbind

Purpose: to release a virtual connection between this client application 106 and a specified second client application 106. Removes the binding id and its mappings from the binding tables 214 of the server connection objects 108 connected to these client applications 106, and in the binding tables 214 of the client connection objects 108 themselves.

Input: a) source client binding id to release

Output: success or error code.

Implementation:

1) Create a new message 238:
    message header 240:
        binding id 244: server application binding id.
        method id: Unbind
        data size: sizeof(user data)
    user data 242:
        client binding id
2) Send message 238.

This message, when received by the server engine 116, causes the server application 110 to notify the target of the translated binding id to unbind its client connection object 108.

Stream Out

Purpose: to asynchronously write data bytes from the inbound buffer 230 into the outbound message queue 250 to construct a message.

Input: pointer to buffer, count of bytes in buffer

Output: a message, if completed from the inbound buffer, otherwise number of bytes read.

---

State: {completed message, (incomplete message, buffer position)}
Implementation:
1) Set header position to zero
2) Currently reading in header (header position less than size of message header 240)?
    YES:
        3) Determine amount of space left in message header 240 (fixed size of message header - header position)
        4) Is the amount of data incoming greater than amount of space left (data size>(amount of space left))?
            YES:
                5) Copy (amount of space left) bytes from the buffer to the message header 240
                6) Adjust the header position that many bytes forward
                7) Adjust the amount of data remaining in the inbound buffer by same amount
                8) Convert data from network representation to host form
                9) Set the expected number of user bytes to arrive (from read data size 248)
                10) Set the amount of data consumed to 0
                11) Allocate a buffer for the expected size of user bytes
                GOTO: CONSUME USER DATA
            NO:
                11) Copy the number of bytes that came in to the header at its current position
                12) Adjust the header position forward by that many bytes
                13) Return out to READING data (FIG. 6, Block 601)
    NO:
        CONSUME USER DATA
        14) Determine the amount of space left in the outbound buffer 224
        15) Is the amount of data remaining in the inbound buffer 230 greater than or equal to the amount space available in the outbound buffer 224?
            YES//MAXIMIZE NETWORK PACKET, enough data remains to fill the outbound buffer 236
                16) Copy (amount of space available in outbound buffer 224) bytes from the inbound buffer 230 to the outbound buffer (buffer is full)
                17) Adjust the buffer position 234 in the inbound buffer 230 by same number of bytes
                18) Send buffer: route/queue message (FIG. 6, Block 605)

-continued

NO//FILL and WAIT FOR MORE
19) Copy (amount of bytes remaining in input buffer 230) from input buffer 230 to outbound buffer 224
20) Reset inbound buffer position 234 to 0.

Stream In

Purpose: to asynchronously read data bytes from the inbound buffer 250 to the inbound message queue 236.
Input: pointer to inbound buffer
Output: success or error code
State: {completed message, (incomplete message, buffer position)}
Implementation:
1) Read data bytes from buffer to network socket, change to network byte order if necessary.

Get

Purpose: to retrieve the next available message 238 from the inbound message queue, and hand it back to the client application 106. This method is called when a Message Arrive event is received.
Input: pointer to inbound buffer.
Output: a pointer to a message 238.

Binding Table Methods

The binding tables 214 provide methods for setting, getting, and removing binding associations.

Set

Purpose: create mapping between a client generated binding id, a server generated binding id, a server connection object.
Input: client binding id, server binding id, pointer to server connection object 108.
Implementation:
1) Set inbound binding id field 218=client binding id.
2) Set outbound binding id field 220=server binding id.
3) Set outbound connection object pointer=pointer to server connection object 108.

Get

Purpose: return mapped vales for an inbound binding id.
Input: inbound binding id.
Output: outbound binding id, pointer to outbound connection object.
Implementation:
1) Lookup inbound binding id field 218 on input.
2) Return outbound binding id field 220.
3) Return outbound connection object pointer.

RemoveBind

Purpose: delete mapping of binding ids. Used when a virtual connection between client applications 106 is closed, as when a client application 106 disconnects from the server application 110.
Input: inbound binding id.
Implementation:
1) Lookup outbound binding id field 220 entry from input inbound binding id.
2) Create a new message 238:
    message header 240:
        binding id 244: outbound binding id.
        method id: Remove
        data size: sizeof(inbound bounding id)
    user data 242:
        inbound binding id
3) Send message 238.
4) Lookup pointer to outbound connection object 108 from input inbound binding id.
5) Call Remove binding id on binding table of outbound connection object 108, pass in the inbound binding id. This removes the mapping in the outbound (second) server connection object.
6) Delete the mapping of the inbound binding id in the present binding table. Deletion after step 5 is necessary to ensure both instances of the inbound binding id are removed.

In another embodiment of the invention, there is provided development tools for creating client-server systems as illustrated in FIG. 1. This aspect of the invention includes code portions to allow an applications programmer to create client applications and server applications operating in the manner described above. The code portions include preferably class definitions and code for the connection object 108, the server engine 116, and the client engine 132. These code portions may be in any suitable computer programming language, such as C++, Ada, or the like, or development environment, such as Microsoft's Visual Basic or Visual C++. In this embodiment, the applications programmer uses the code and class definitions for these objects in conjunction with other code portions that define the functional features of the client applications 106 to create a client-server system.

In summary, in its various embodiments, the present invention provides a messaging architecture that allows any number of multiple peer level client applications to communicate with each other, without the limitations imposed by the number of available physical network connections in each client computer. Another benefit of the present invention is that it optimizes, in real time, the network packet content of each transmission between client applications, thereby reducing the bandwidth requirements. A third benefit of the invention is that it allows each client application to operate completely asynchronously with respect to any other client application, or the server, even where the clients are engaged in data exchange and request handling. This capability is provided without the need to use complex multi-threaded, multitasking client applications, thereby enabling the rapid development of complex client-server systems.

I claim:

1. A computer system, comprising:
    at least two first client computers, each first client computer including at least one first client application, each first client application including a single physical connection to a server application in a server computer, the connection to the server application transferring network packets between the first client computer and the server computer, each client application adapted to transmit individual messages to the server application, each message having a variable amount of message data, and to aggregate selected messages for one or more other client applications into a single network packet as the messages are available, and sending each network packet to the server application;
    a second client computer including a second client application with a single physical connection to the server application, the connection to the server for transferring network packets between the second client computer and the server computer;
    at least two of the first client applications each separately creating and sending a network packet containing at least one message for the second client application and at least one message for a different client application to the server application;
    the server computer including:

a binding table associated with each specific client application, each binding table storing a plurality of bindings, each binding associating the specific client application to a physical connection to another client application; and the server application, the server application receiving the network packets from the at least two first client applications, extracting from each received network packet the at least one message for the second client application, identifying a binding in the binding table of each first client application to determine the physical connection to the second client application, and placing the extracted messages for the second client application in a message queue communicatively coupled to the selected physical connection to the second client application.

2. The system of claim 1, wherein:

each connection between a client application and the server application has a maximum transfer unit defining a maximum amount of data for a network packet sent along the connection; and, each client application aggregates data from messages into a network packet as messages are available for sending to the server application, and until the network packet cannot receive all of the message data of a next available message; and, the server application creates a single network packet from the separate messages received from the first client applications that includes an amount of data equal to, or less than a multiple of the maximum transfer unit for the connection between the server application and the second client application.

3. The computer system of claim 2, wherein the server application comprises:

a plurality of connection objects, each connection object holding a single physical connection to a client application and including:

an outbound message queue that receives from the server application messages for a client application connected to the connection object;

an outbound buffer sized to a multiple of the network maximum transmission unit for the connection, and in which messages in the message queue are aggregated until the outbound message queue is empty, or the amount of space remaining in the outbound buffer is less than the size of a message available in the message queue, the messages in the outbound buffer sent to the client application connected to the connection object.

4. The computer system of claim 1, wherein each message from a first client application to a second client application includes a binding identification number identifying within the first client application a virtual connection between the first client application and the second client application.

5. The computer system of claim 4, wherein the binding table of a first connection object coupled to a first client application includes at least one binding comprising:

a) a first binding identification number field, including a binding identification number generated by the first client application, and identifying the virtual connection between the first client application and second client application; and c) a second binding identification number field including a binding identification number generated by the server application, and also identifying the same virtual connection between the first client application and the second client application;

wherein the server application selects the binding from the binding table that has a binding identification number in either the first or second binding identification number field that matches the binding identification number in the message, and replaces the binding identification number in the message with the non-matching binding identification number from the selected binding.

6. The computer system of claim 5, wherein each binding in a binding table includes a reference to a second connection object that is coupled to the second client application that is to receive the message from the first client application coupled to the first connection object, such that the server application uses the reference in the selected binding to place the message in the message queue of the second connection object.

7. In a client-server system including a plurality of client applications and a server application, each of the client applications coupled to the server application on a single network connection having a maximum transmission unit or network packets, and capable of sending a message to, and receiving a message from any other client application along the single network connection in a network packet including a plurality of messages, each client application having a virtual connection to any other client application that it receives a message from or sends a message to, a plurality of objects in the server application for routing messages between client applications, and for aggregating messages, one object for each client application, the object for each client application providing the connection between the client application and the server, each object comprising:

an outbound message queue that receives from the server application messages for the client application connected to the object, each message having a binding identification number identifying in the client application connected to the object a virtual connection between the client application connected to the object and another client application;

an outbound buffer sized to a multiple of the network maximum transmission unit for the connection between the client application and the server, and in which messages in the message queue are aggregated until the message queue is empty, or the amount of space remaining in the outbound buffer is less than the size of a message available in the message queue, the messages in the outbound buffer sent to the client application connected to the object; and, a binding table that includes for each virtual connection between the client application connected to the object and other client application a binding, the binding comprising:

a) an inbound binding identification number field that contains either:

i) a binding identification number generated by the server that identifies the virtual connection; or, ii) a binding identification number generated by the client application connected to the object that identifies in the client application the virtual connection;

b) an outbound binding identification number field that contains either:

i) a binding identification generated by a client application that has the virtual connection to the client application connected to the object where the inbound binding identification number field contains the binding identification number generated by the server that identifies the same virtual connection between the client applications;

ii) a binding identification number generated by the server application that identifies the virtual connection where the inbound binding identification number field contains the binding identification number generated by the client application connected to the object that identifies the same virtual connection;

c) a reference field containing a reference to another object connected to another client application;

wherein the server application routes a message from a first client application to a second client application by selecting in the binding table of the object connected to the first client application the binding that contains in the inbound binding identification number field a binding identification number that matches the binding identification number in the message, and placing the message on the message queue of the object referenced in the reference field of the selected binding, the server replacing the binding identification number in the message with the binding identification number in the outbound identification number field of the selected binding.

8. A computer implemented method for routing messages between any number of client applications coupled to a server application, and aggregating messages to any client application from multiple other client applications into network packets, the method comprising;

storing a binding table associated with each specific client application, each binding table storage a plurality of bindings, each binding associating the specific client application to a physical connection to another client application;

receiving in the server from each of at least two first client applications, a network packet containing a plurality of messages for different client applications, including at least one message to a same second client application, each message having an amount of data;

extracting the messages for the same second client application from the network packets;

identifying a binding in the binding table of each first client application to determine the physical connection to the second client application;

placing the extracted messages for the second client application in a message queue communicatively coupled to the selected physical connection to the second client application; and sending the extracted messages in the message queue to the second client application.

9. The method of claim 8, further comprising:

loading messages from the message queue into a buffer connected to the second client application and dedicated to the second client application, the buffet capable of holding an amount of data equal to a multiple of the maximum transmission unit for a network packet on the connection, the messages loaded into the buffer so long as the message queue is not empty, and the amount of data in a next message available on the message queue is less than the amount of space remaining in the buffer.

10. A server application for routing messages between a plurality of client applications, comprising:

a plurality of connection objects, each connection object comprising:

an outbound message queue that receives messages for the client application connected to the connection object, each message having a binding identification number identifying in the client application connected to the connection object a virtual connection between the client application connected to the connection object and another client application;

an outbound buffer sized to a multiple of a network maximum transmission unit for the connection between the client application and the server application, and in which messages in the message queue are aggregated until the outbound message queue is empty, or the amount of space remaining in the outbound buffer is less than the size of a message available in the message queue, the messages in the outbound buffer sent to the client application connected to the connection object; and a binding table that includes for each virtual connection between the client application connected to the connection object and another client application an association between a pair of binding identification numbers uniquely associated with the virtual connection between the client applications;

the plurality of connection objects including:

a plurality of first connection objects each coupled to a different first client application to receive a network packet therefrom, each network packet including at least one message for a second client application; and a second connection object coupled to the second client application to provide a network packet including a plurality of messages from the different first client applications to the second client application; and a server engine to receive the network packets via the first connection objects from at least two first client applications, extract from each received network packet the at least one message for the second client application, determine from the binding tables of the first client applications the virtual connection between each first client application and the second client application, and place the messages in the outboard message buffer of the connection object of the second client application to send to the second client application.

11. The server application of claim 10, wherein each association in the binding table further comprises:

a) an inbound binding identification number field that contains either:

i) a binding identification number generated by the server that identifies the virtual connection; or ii) a binding identification number generated by the client application connected to the object that identifies in the client application the virtual connection;

b) an outbound binding identification number field that contains either:

i) a binding identification generated by a client application that has the virtual correction to the client application connected to the object where the inbound binding identification number field contains the binding identification number generated by the server that identifies the same virtual connection between the client applications;

ii) a binding identification number generated by the server application that identifies the virtual connection where the inbound binding identification number field contains the binding identification number generated by the client application connected to the object that identifies the same virtual connection;

c) a reference field containing a reference to another object connected to another client application;

wherein the server application routes a message from a first client application to the second client application by selecting in the binding table of the connection object connected to the first client application the binding that contains in the inbound binding identification number field a binding identification number that matches the binding identification number in the message, and placing the message on the message queue of the connection object referenced in the reference field of the selected binding, the server replacing the binding identification number in the message with the binding identification number in the outbound identification number field of the selected binding.

* * * * *